Figure 1:
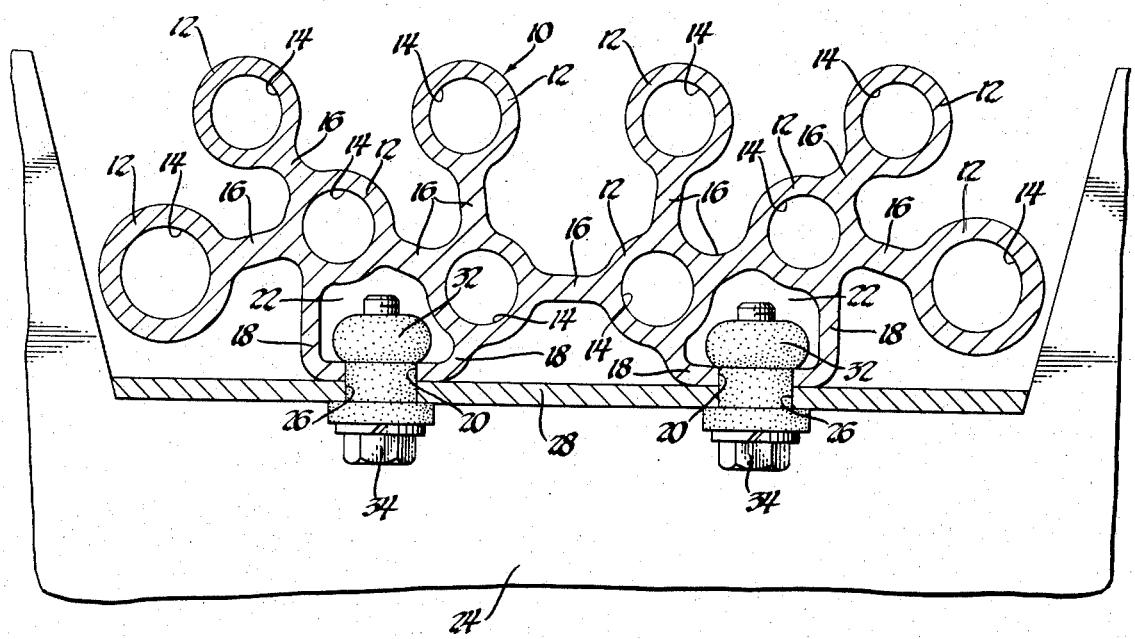

United States Patent
Manning

[11] 3,805,847
[45] Apr. 23, 1974

[54] EXTRUDED CONDUIT BUNDLE AND MOUNTING MEANS THEREFOR

[75] Inventor: Donald L. Manning, Orchard Lake, Mich.

[73] Assignee: General Motors Corporation, Detroit, Mich.

[22] Filed: May 30, 1972

[21] Appl. No.: 257,602

[52] U.S. Cl. ............................................. 138/115
[51] Int. Cl. ............................................. F16l 9/18
[58] Field of Search .......... 138/106, 107, 111, 115, 138/177, 117; 248/54 R, 60, 70; 85/70; 72/264

[56] References Cited
UNITED STATES PATENTS

| | | | |
|---|---|---|---|
| 3,478,667 | 11/1969 | Bourquin | 138/107 X |
| 764,779 | 7/1904 | Stone | 138/115 |
| 2,308,969 | 1/1943 | Riesing | 248/54 R |
| 2,893,722 | 7/1959 | Beck | 85/70 X |

Primary Examiner—Jerry W. Myracle
Attorney, Agent, or Firm—W. E. Finken

[57] ABSTRACT

An extruded conduit bundle has a plurality of fluid passages defined by tubular portions connected by integrally extruded webs extending therebetween. A pair of integrally extruded legs extend from the conduit bundle and are flanged inwardly toward one another to provide a continuous slot opening into a cavity. The conduit bundle is attached to a vehicle body by well-nuts inserted through a hole in the body and through the slot into the cavity of the conduit bundle. A bolt screwed into the well-nut spreads the nut radially to engage the flanges of the legs against the vehicle body.

1 Claim, 2 Drawing Figures

PATENTED APR 23 1974 3,805,847

EXTRUDED CONDUIT BUNDLE AND MOUNTING MEANS THEREFOR

The invention relates to a fluid conduit device and more particularly to an extruded conduit bundle and means for mounting the extruded conduit bundle to a vehicle body.

It is known in vehicle bodies to pass various vehicle system operating fluids through separate conduits. These conduits are typically mounted to the various body members of the vehicle by resilient grommets which encircle the conduit and are press fit into apertures in the body member to which the conduit is mounted.

Since motor coaches and railway coaches are of considerable length and employ a number of fluid operated systems, they accordingly require a large number of such separate conduits and the mounting of such conduits to the vehicle body at frequent intervals over their length to adequately support such conduits. Furthermore, provision must be made in such vehicles for the thermal expansion and contraction of the fluid conduits.

The present invention provides an extruded conduit bundle having a plurality of integral fluid passages therein defined by integral tubular portions connected by integral webs extending between the tubular portions. The extruded conduit bundle also includes continuous longitudinally extending legs flanged inwardly toward each other to provide a continuous slot which opens into a cavity. The conduit bundle is attached to the vehicle body by well-nuts which are inserted through a hole in the body member and through the slot into the cavity of the conduit bundle. A bolt screwed into the well-nut spreads the well-nut radially in the well known manner to secure the conduit bundle to the body member.

Conventional pipe or hole fittings are threaded into the respective fluid passages of the extruded conduit bundle at their ends to facilitate connection to the various fluid systems of the vehicle.

The considerable amount of linear thermal expansion in the conduit bundle which may result from ambient temperature changes as well as the combined thermal effect of the various fluids communicated through the fluid passages of the conduit bundle does not overstress the extruded conduit bundle inasmuch as the well-nut attachment permits limited relative movement between the conduit bundle and the body member.

One feature of the present invention is the provision of an extruded conduit bundle having a plurality of integral separated fluid passages and integral mounting means for mounting the bundle on a vehicle body.

A further feature of the invention is the provision of an extruded conduit bundle having a plurality of integral fluid passages defined by integrally connected tubular portions and integral legs defining a continuous slot opening into a cavity permitting the attachment of the extruded conduit bundle to a vehicle body member by a well-nut.

Figure 2:
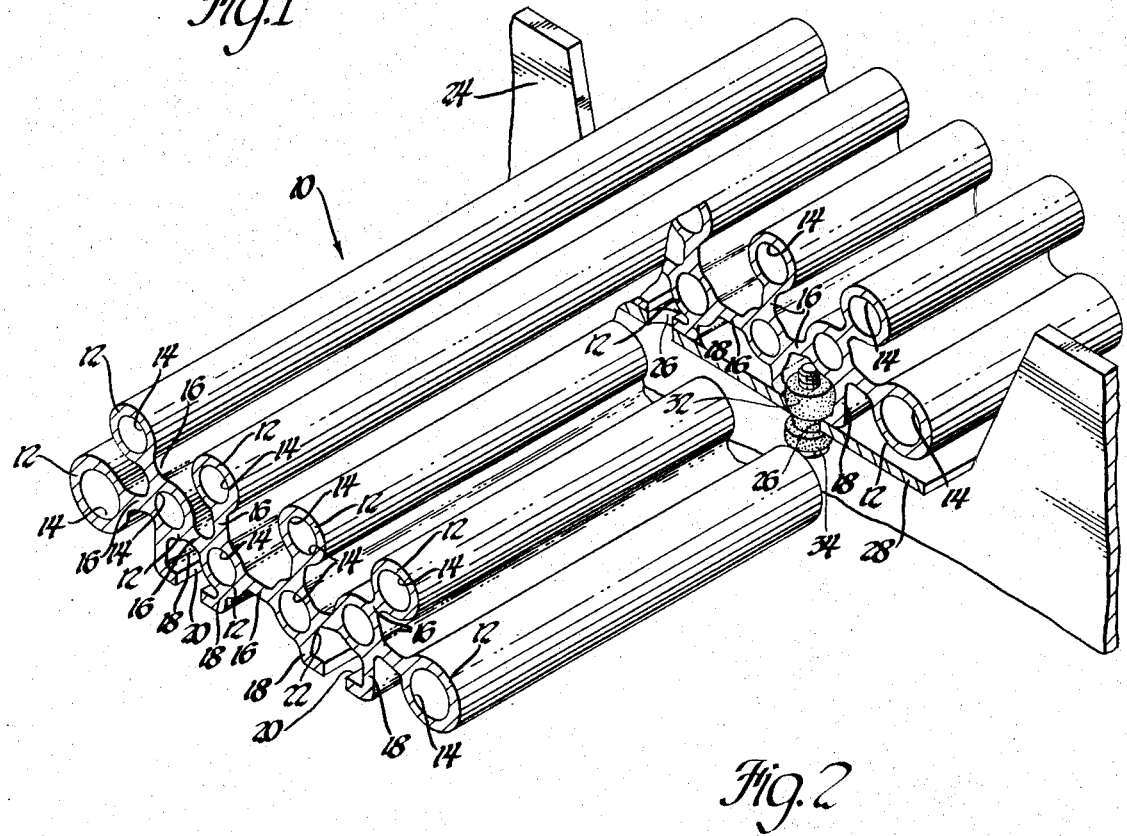

These and other features, objects, and advantages of the invention will become apparent upon consideration of the appended specification and the drawings in which:

FIG. 1 is a sectional view of an extruded conduit bundle according to this invention mounted on a vehicle body; and FIG. 2 is a perspective view of the extruded conduit bundle mounted on the body.

Referring to FIGS. 1 and 2, the extruded conduit bundle is indicated generally at 10. The extruded conduit bundle 10 is made of a suitable aluminum or aluminum alloy and includes a plurality of circular cross-section tubular portions 12 which respectively define a plurality of fluid passages 14. The tubular portions 12 of the extrusion are integrally connected by webs 16 which space the tubular portions apart relative to each other and also act as heat radiating fins. Downwardly extending inwardly flanged integral legs 18 define a continuous slot 20 which opens into a cavity 22. The tubular portions 12, webs 16, and legs 18 of the extruded conduit bundle 10 provide sufficient structural rigidity to the conduit bundle to permit it to extend unsupported between widely spaced body members 24 which are cutaway to receive the bundle 10. Spaced holes 26 are provided in a flange 28 at the baae edge of the cutaway of the body member and are aligned with the continuous slots 20 of the extruded conduit bundle 10. Attachment of the extruded conduit bundle 10 to the body member 24 is by well-nuts 32 and bolts 34. The well-nut 32 is inserted through hole 26 of the body member and slot 20 of the extruded conduit bundle into the cavity 22. Tightening of the bolt 34 into the well-nut 32 expands the well-nut 32 radially in the well known manner, thereby holding the inwardly flanged legs 18 of the extruded conduit bundle 10 in engagement of the flange 28 of the body member 24. It will be apparent that the extruded conduit bundle may be attached in this manner to any member of the body having a hole 26.

The tubular portions 12 of the conduit bundle are tapped at their respective ends to permit connection of conventional hose or pipe fittings to facilitate connection to the hydraulic fluid, water, refrigerant, and other fluid systems of the vehicle body. It will be apparent that any of the tubular portions 12 on the periphery of the extruded bundle 10 may be cut short to permit connection of a fluid system thereto. It will further be noted that a portion may be removed from the middle of one of the tubular portions 12 and the resulting separate fluid passages 14 employed for separate fluid systems.

The thermal expansion of the extruded conduit bundle 10 resulting from changes in the ambient temperature as well as temperature changes in the various fluids communicated through the conduit is relieved by limited relative linear movement between the conduit bundle 10 and body members 24 as permitted by slipping of the well-nut 32 in the slot 20 of the extruded conduit bundle 10.

What is claimed is:

1. The combination comprising a vehicle body having a body member and vehicle fluid systems with operating fluids at various and varying operating temperatures, an extruded member having a plurality of tubular portions defining separate fluid passages in which the fluids are separately transported, the plurality of tubular portions being spaced apart from one another by integral interconnecting webs so that the path of thermal conduction between the fluids at various and varying temperatures is limited to the cross section of the interconnection and heat transfer between the fluids is inhibited, a headed fastener on the body member, and a pair of integrally extruded legs extending from the extruded member and flanged inwardly towards one another to define a continuous slot opening into a cavity for receiving the head of the fastener for holding the extruded member in engagement with the body member of the vehicle body.

* * * * *